(12) United States Patent
Harpenau (10) Patent No.: US 6,414,407 B1
(45) Date of Patent: Jul. 2, 2002

(54) LIQUID-COOLED ELECTRICAL MACHINE WITH INTEGRAL BYPASS

(75) Inventor: Kevin Harpenau, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 39 days.

(21) Appl. No.: 09/634,411

(22) Filed: Aug. 9, 2000

(51) Int. Cl.⁷ .............................. H02K 9/00; H02K 9/16
(52) U.S. Cl. ............................................ 310/58; 310/54
(58) Field of Search ................................ 310/54, 58–59, 310/61–64, 89, 91; 29/596–598

(56) References Cited

U.S. PATENT DOCUMENTS

| | | | | |
|---|---|---|---|---|
| 3,681,628 A | * | 8/1972 | Krastchew | 310/54 |
| 4,739,204 A | * | 4/1988 | Kitamura et al. | 310/54 |
| 5,798,586 A | * | 8/1998 | Adachi | 310/54 |
| 6,072,253 A | * | 6/2000 | Harpenau et al. | 310/58 |

* cited by examiner

Primary Examiner—Tran Nguyen
(74) Attorney, Agent, or Firm—John E. Kajander (57) ABSTRACT

An electrical machine comprising a rotor (26) mounted on a shaft (29) for rotation therewith and defining an axis of rotation, and a stator (54) disposed coaxially with and in opposition to the rotor (26). The electrical machine further comprises a housing (22, 24) enclosing the stator (54) and the rotor (26), the housing (22, 24) having a first axial end with a wall with an inner surface and an outer surface and a second axial end with a wall with an inner surface and an outer surface. The electrical machine also includes a first cooling tube (80') having a first end and a second end and an embedded portion thereof embedded between the first inner surface and the first outer surface. The first end and the second end of the first cooling tube have a port therebetween directly fluidically coupling the first end to the second end. A second cooling tube (82') having a first end and a second end and an embedded portion thereof embedded between said inner surface and said outer surface of the wall (83) of the second axial end. The first end (226) of the first cooling tube and the first end (228) of the second cooling tube (82') are fluidically coupled together to permit fluid flow in parallel between the first cooling tube (80') and the second cooling tube (82').

19 Claims, 8 Drawing Sheets

LIQUID-COOLED ELECTRICAL MACHINE WITH INTEGRAL BYPASS

RELATED APPLICATIONS

The present invention is also related to U.S. patent Ser. No. 09/664,671 entitled "Liquid-Cooled Electrical Machine Having Parallel Flow" incorporated by reference herein.

BACKGROUND OF THE INVENTION

The present invention relates generally to electrical machines, and more particularly to cooling of electrical machines.

DESCRIPTION OF THE RELATED ART

Ways are continually sought to increase the electrical output of automotive alternators. With increased electrical output comes additional heat generated in the various electrical components of the alternator. In addition, friction in the bearings which support the rotor shaft of the alternator also generates heat. Because heat generated in an alternator is frequently the factor which limits the electrical output of the alternator, effective cooling of the alternator is very important.

Circulating liquid within an alternator has been recognized as one means for providing cooling. A liquid cooling design which provides effective cooling and which can support demands for ever-reducing package size of the alternator can be particularly advantageous.

In a vehicle a cooling liquid supply may be provided by the engine cooling system. Engine coolant may be routed from the engine cooling system to cool the electrical machine. One problem associated with placing a component in the cooling system is that typically the pressure drop across the system may be substantial enough to affect the performance of the cooling system. To alleviate pressure losses bypass hoses and valves have been proposed. However, the space within automotive vehicles is scarce.

Therefore it would be desirable to minimize the space requirement for a liquid cooled electrical machine.

SUMMARY OF THE INVENTION

The present invention provides an electrical machine comprising a rotor mounted on a shaft for rotation therewith and defining an axis of rotation, and a stator disposed coaxially with and in opposition to the rotor. The electrical machine further comprises a housing enclosing the stator and the rotor, the housing having a first axial end with a wall with an inner surface and an outer surface and a second axial end with a wall with an inner surface and an outer surface. The electrical machine also includes a first cooling tube having a first end and a second end and an embedded portion thereof embedded between the first inner surface and the first outer surface. The first end and the second end of the first cooling tube have a port therebetween directly fluidically coupling the first end to the second end. A second cooling tube has a first end and a second end and an embedded portion thereof embedded between said inner surface and said outer surface of the wall of the second axial end. The first end of the first cooling tube and the first end of the second cooling tube are fluidically coupled together to permit fluid flow in parallel between the first cooling tube and the second cooling tube.

Designs according to the present invention are advantageous in that they can provide effective cooling of an electrical machine while also supporting packaging-efficient electrical machine designs.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
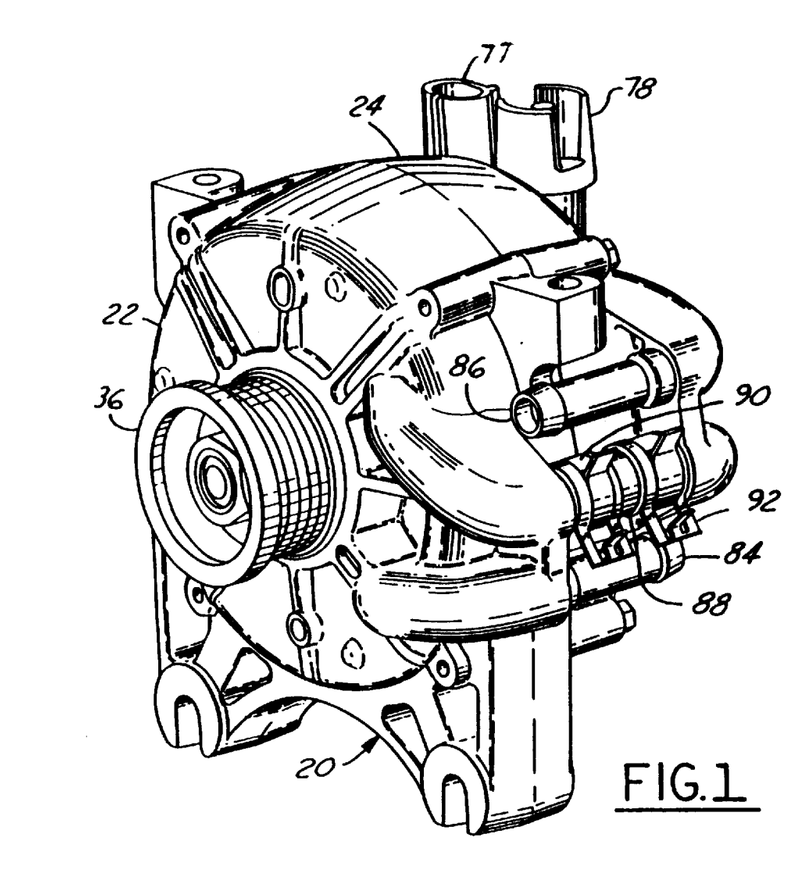
FIG. 1 is a perspective view of an alternator 20 according to one embodiment of the present invention.
Figure 2:
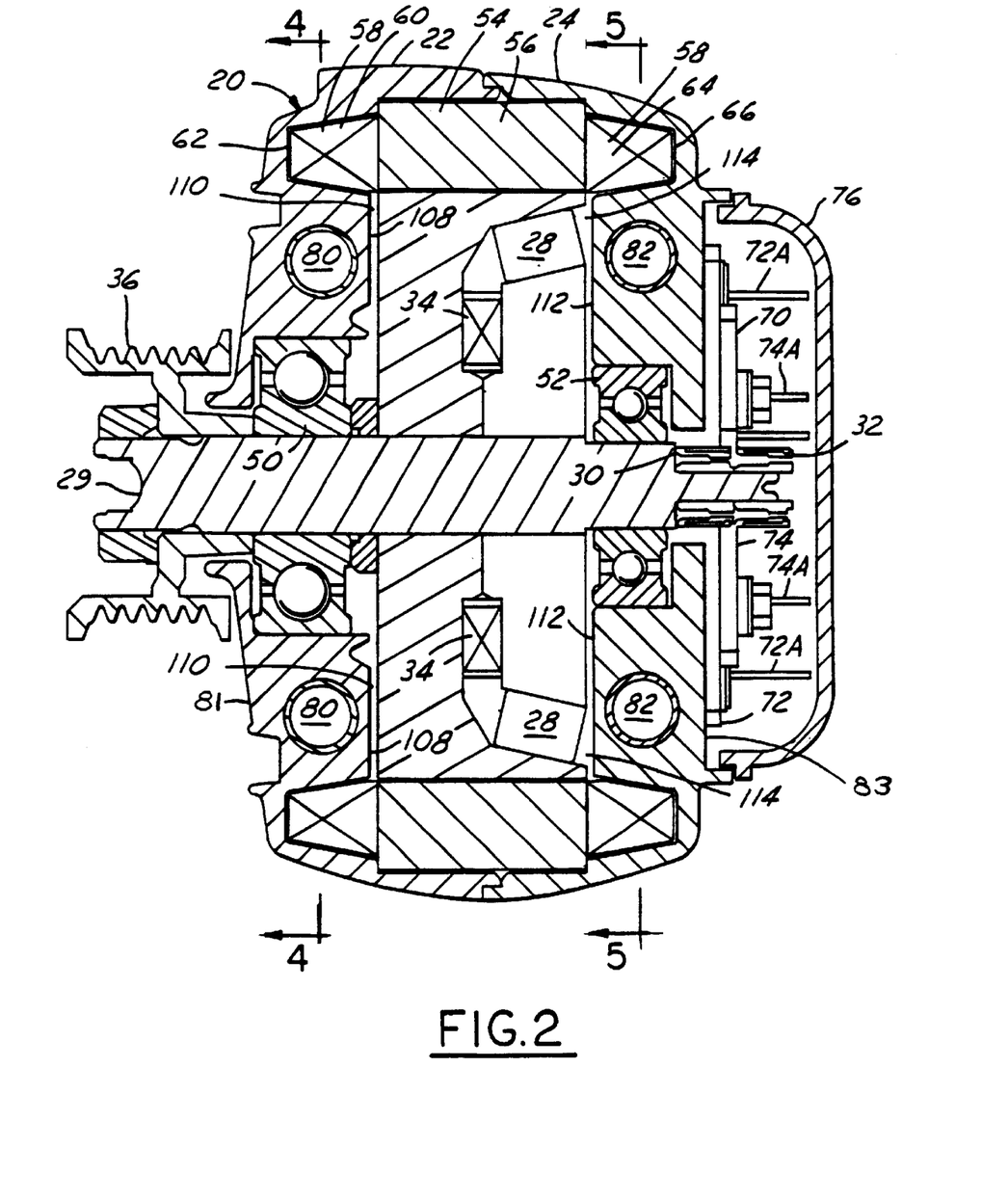
FIG. 2 is a cross-sectional view of alternator 20 taken along a plane parallel to the axis of rotation of alternator 20.
Figure 3:
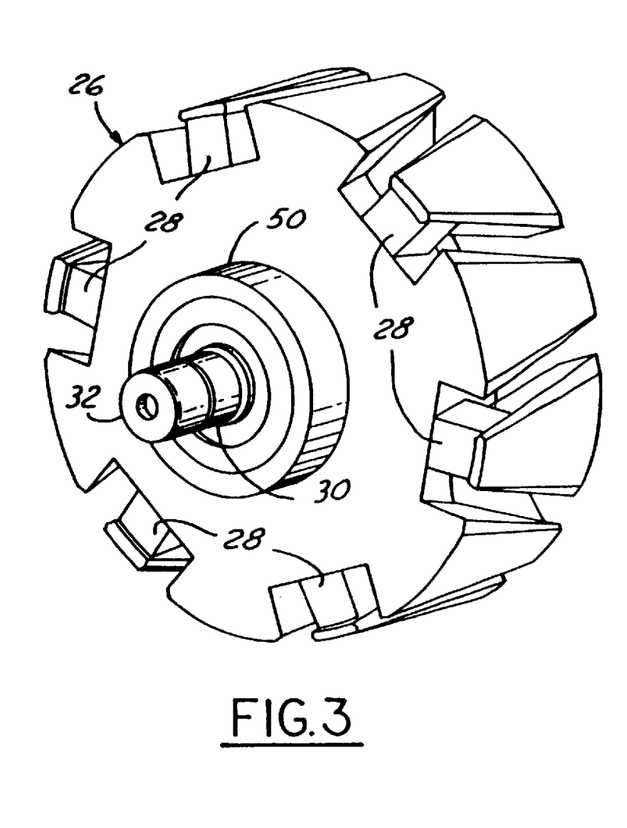
FIG. 3 is a perspective view of rotor 26 of alternator 20.

Refer first to FIGS. 1–3, an alternator 20 includes a front housing portion 22 and a rear housing portion 24 which are suitably bolted or otherwise attached together. Front housing portion 22 and rear housing portion 24 are preferably metallic. Included within front housing portion 22 and rear housing portion 24 is a rotor 26. Those skilled in the art will recognize rotor 26 as being generally of the "claw-pole" variety. A plurality of permanent magnets 28 are disposed within rotor 26 in order to enhance the electrical output of alternator 20.

Rotor 26 includes a shaft 29 having two slip rings 30 and 32 which are means for providing electrical power from a voltage regulator (not shown in the particular sectioning employed in FIG. 2) to a field coil 34 disposed within rotor 26. Also coupled to shaft 29 is a pulley 36, or other means for rotating rotor 26. Shaft 29 is rotatably supported by a front bearing 50, itself supported by front housing portion 22, and a rear bearing 52, rotatably supported by rear housing portion 24.

A stator 54 is disposed in opposition to rotor 26. Stator 54 includes a ferromagnetic stator core 56, on which stator windings 58 are wound. The end turns 60 of stator windings 58 on one axial side of stator core 56 are substantially enclosed in a groove 62 in front housing 22. The end turns 64 of stator winding 58 on the other axial side of stator core 56 are substantially enclosed in a groove 66 in rear housing 24. Preferably, end turns 60 and 64 are encapsulated in a highly thermally conductive compound in order to facilitate heat transfer away from stator windings 58.

A rectifier 70, coupled to stator windings 58 in order to rectify the alternating current output generated in stator windings 58 by the operation of alternator 20, is mounted to rear housing 24. Rectifier 70 includes a negative rectifier plate 72, which forms the common connection for the cathodes of the "negative" diodes 72A. Rectifier 70 also includes a positive rectifier plate 74, which forms the common connection for the anodes of the "positive" diodes 74A. Negative rectifier plate 72 and positive rectifier plate 74 are electrically insulated from one another. A plastic cover 76 covers the rear of alternator 20, including rectifier 70. Electrical connectors 77 and 78 provide the required electrical connections to and from alternator 20. As those connections are conventional, they are not described in detail here.

Front housing portion 22 also includes cooling tube 80, and rear housing portion 24 includes cooling tube 82. Cooling tubes 80 and 82 are preferably metallic, in order to assure good heat transfer from housing portions 22 and 24 to cooling tubes 80 and 82, respectively. Cooling tubes 80 and 82 are preferably die-cast into their respective axial end walls 81, 83 of housing portions 22 and 24. Of course, if cooling tubes 80 and 82 are included 20 within housing portions 22 and 24 by die casting, the material comprising cooling tubes 80 and 82 must have a higher melting temperature than the material comprising housing portions 22 and 24, in order to allow cooling tubes 80 and 82 to be die-cast therein.

The ends of cooling tube 80 emerge from front housing portion 22, and the ends of cooling tube 82 emerge from rear housing 24. End 84 of cooling tube 80 forms an inlet into which cooling fluid can be introduced into alternator 20. End 86 of cooling tube 82 forms an outlet from which cooling fluid exits from alternator 20. The remaining two ends of cooling tube 80 and cooling tube 82 are coupled together by a "cross-over" formed by flexible tube 88 and two clamps 90 and 92. Cooling fluid can thus flow into inlet end 84 of cooling tube 80, through the length of cooling tube 80, through the "cross-over" into cooling tube 82, through the length of cooling tube 82, and out the outlet end 86 of cooling tube 82. Inlet end 84 and outlet end 86 are coupled to a source of cooling fluid such as the cooling system of a motor vehicle engine.

Figure 4:
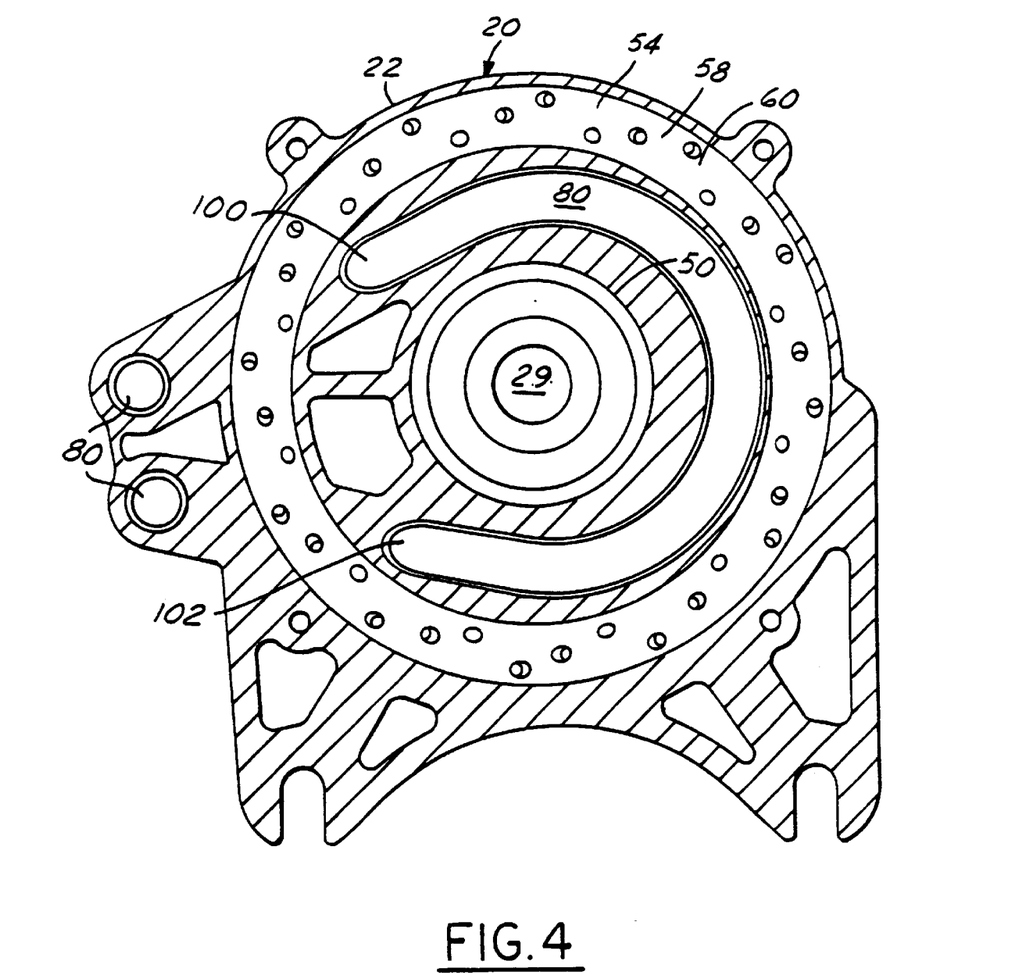
FIG. 4 is a cross-sectional view of alternator 20 taken along line 4—4 of FIG. 2.

Referring now to FIG. 4, it can be seen that cooling tube 80 is formed substantially as a circular loop until points 100 and 102, where cooling tube 80 begins to emerge from front housing portion 22.

Figure 5:
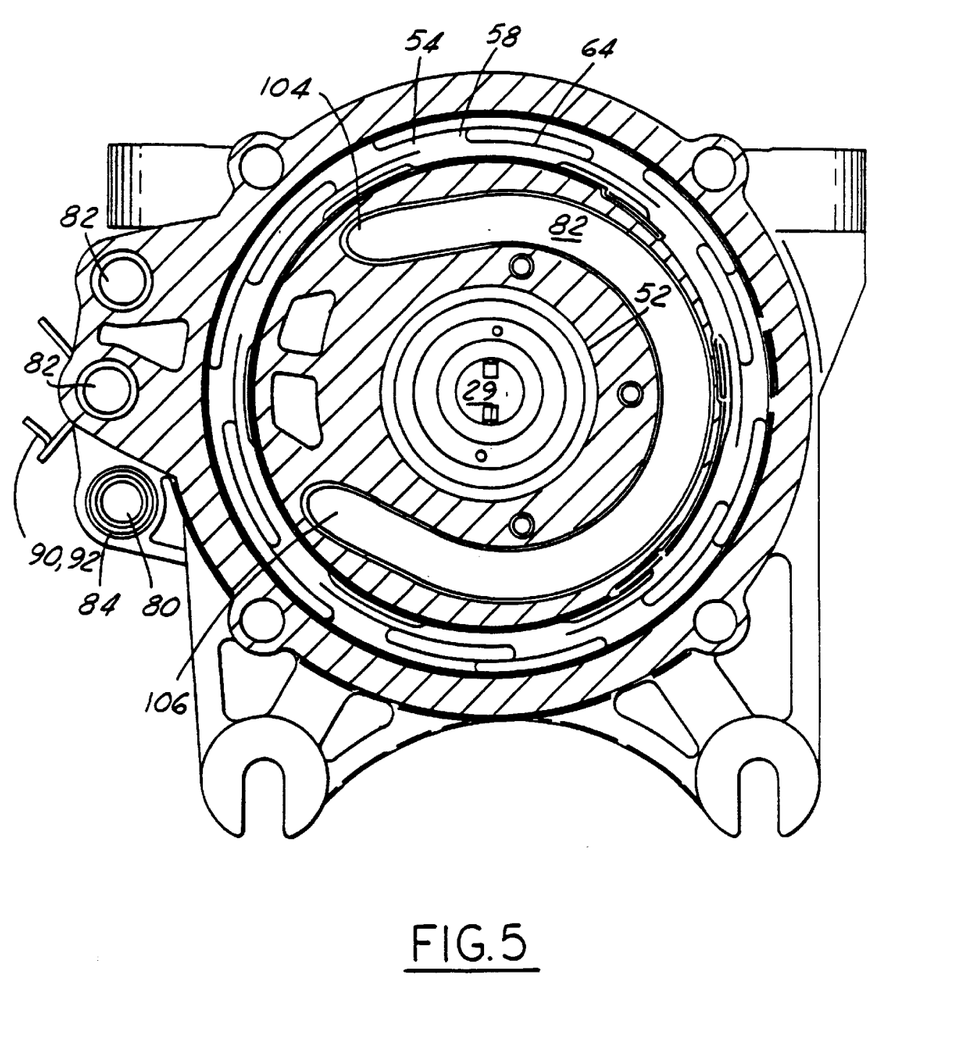
FIG. 5 is a cross-sectional view of alternator 20 taken along line 5—5 of FIG. 2.

Referring now additionally to FIG. 5, it can be seen that cooling tube 82 is also formed in a substantially circular loop until points 104 and 106, where cooling tube 82 begins to emerge from rear housing portion 22.

The design disclosed herein is particularly effective for cooling alternator 20, for a number of reasons. First, end turns 60 and 64 of stator 54 are substantially enclosed by grooves 62 and 66 in the housing of alternator 20. Because the housing is cooled by cooling tubes 80 and 82, heat generated in stator windings 58 is effectively conducted away from those windings. Second, front housing portion 22 presents a large, substantially flat surface 108 to rotor 26 across a small air gap 110. Air gap 110 is preferably about 0.5 millimeters wide. Because front housing portion 22 is cooled by cooling tube 80, the large, flat surface 108 across small air gap 110 provides for substantial heat transfer away from rotor 26, including heat generated in field coil 34. Rear housing portion 24 presents a similar large, substantially flat surface 112 to rotor 26 across a small air gap 114. Air gap 114 is preferably about 0.5 millimeters wide. Third, with bearings 50 and 52 mounted in housing portions 22 and 24 and in proximity with cooling tubes 80 and 82, heat generated in bearings 50 and 52 due to rotation of shaft 29 is effectively conducted away.

The design disclosed herein provides the cooling advantages described immediately above, while also contributing to alternator 20 having a short axial length. It can be seen that the axial alignment of cooling tube 80, end turns 60 and bearing 50, as well as the axial alignment of cooling tube 82, end turns 64 and bearing 52 cause alternator to have the short axial length. This is very much an advantage in packaging alternator 20 in a vehicle.

Figure 6:
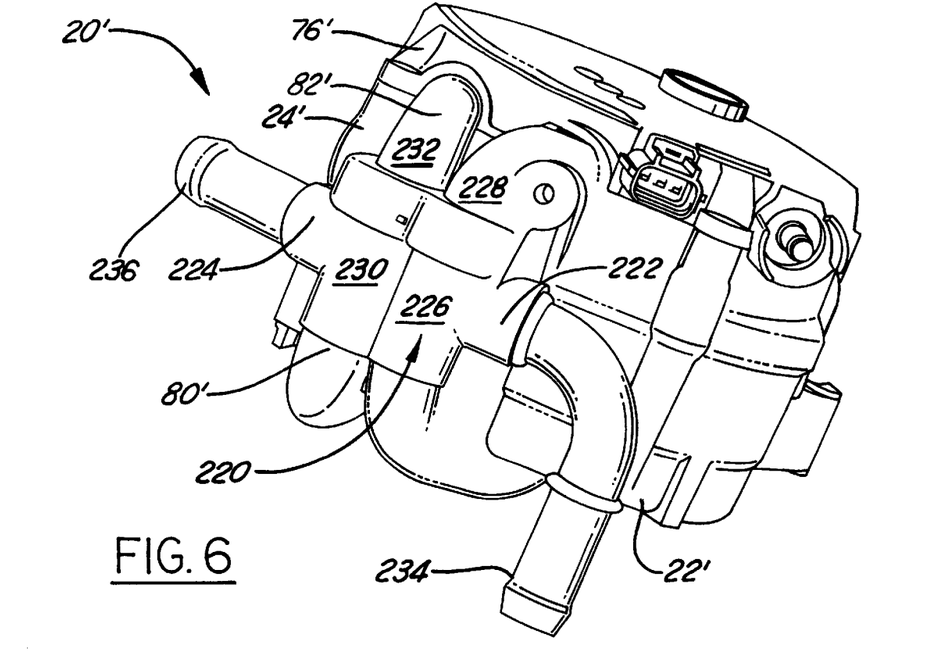
FIG. 6 is a perspective view of a second embodiment of the invention.
Figure 7:
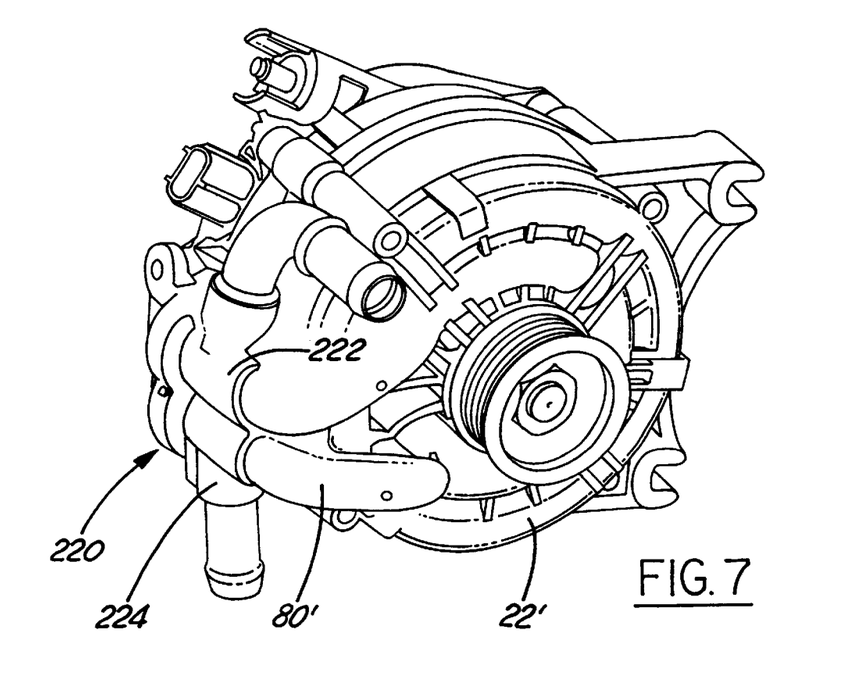
FIG. 7 is a rotated perspective view of the second embodiment shown in FIG. 6.

Referring now to FIGS. 6 and 7, a second embodiment having parallel flow as opposed to the serial flow described above is illustrated. In the following description the same reference numerals that are used above in the first embodiment are primed for the same components in FIG. 6. In this embodiment, a fluid interface 220 is used for coupling fluids to alternator 20'. When fluid enters alternator 20' through fluid interface 220, fluid travels through cooling tube 80' and cooling tube 82' simultaneously. The fluid then exits fluid interface 220 from both cooling tube 80' and cooling tube 82'. Fluid interface 220 has an inlet 222 and an outlet 224. In the preferred embodiment, inlet 222 and outlet 224 are coupled to the cooling system of an automotive vehicle. As will be further described below, it is preferred to have a minimal pressure drop across the alternator. Therefore, providing a parallel flow as in FIGS. 6 and 7 versus a series flow reduce the pressure drop by as much as 50 percent. In the preferred embodiment, inlet 222 and outlet 224 are located on the same housing 22'. However, those skilled in the art would recognize that inlet 222 and outlet 224 may also be located on housing 24'.

To achieve the parallel flow the cooling tube 80' has a first end 226 fluidically and mechanically coupled to first end 228 of second cooling tube 82'. First end 226 and first end 228 are fluidically coupled to inlet 222. Second end 230 of first cooling tube 80' is fluidically and mechanically coupled to second end 232 of second cooling tube 82'. Second end 230 and second end 232 are fluidically coupled to outlet 224.

An inlet hose interface 234 may be coupled to in Let 222. An outlet hose interface 236 is preferably coupled to outlet 224. Both inlet hose interface 234 and outlet hose interface 236 are mechanically coupled to the respective inlet 222 and outlet 224. The mechanical coupling may be fixed or may be rotatable to provide convenient assembly. Also, by locating the inlet 222 and the outlet 224 on the same housing, the ease of assembly during manufacture of the vehicle is increased in the ever shrinking underhood environment.

Figure 8:
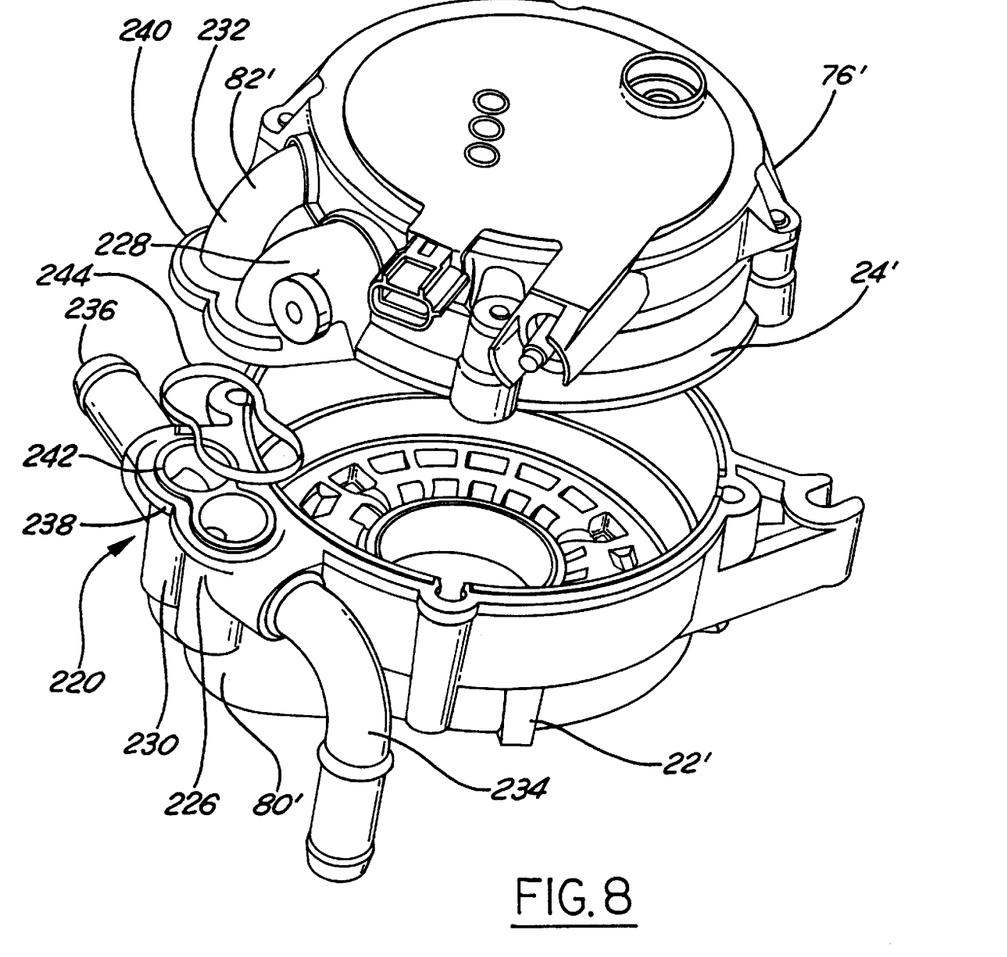
FIG. 8 is a partially exploded view of the second embodiment shown in FIG. 6.

Referring now to FIG. 8, a partial exploded view of alternator 20' is illustrated. As can be seen, fluid interface 220 has a first flange 238 coupled adjacent to first end 226 and second end 230. A second flange 240 is positioned adjacent first end 228 and second end 232 of second cooling tube 82'. As is illustrated, each flange 238, 240 has nearly a "figure 8" shape. At least one of the flanges 238 and 240 preferably have a seal channel 242 formed therein. Seal channel 242 is sized to receive a seal 244 at least partially therein. Seal 244 provides a seal between first flange 238 and second flange 240 to prevent fluid leakage there-between. These skilled in the art will recognize various types of seals and gaskets may be used.

To conserve material a common wall 246 is preferably located between first end 226 and second end 230 of first cooling tube 80'.

Figure 9:
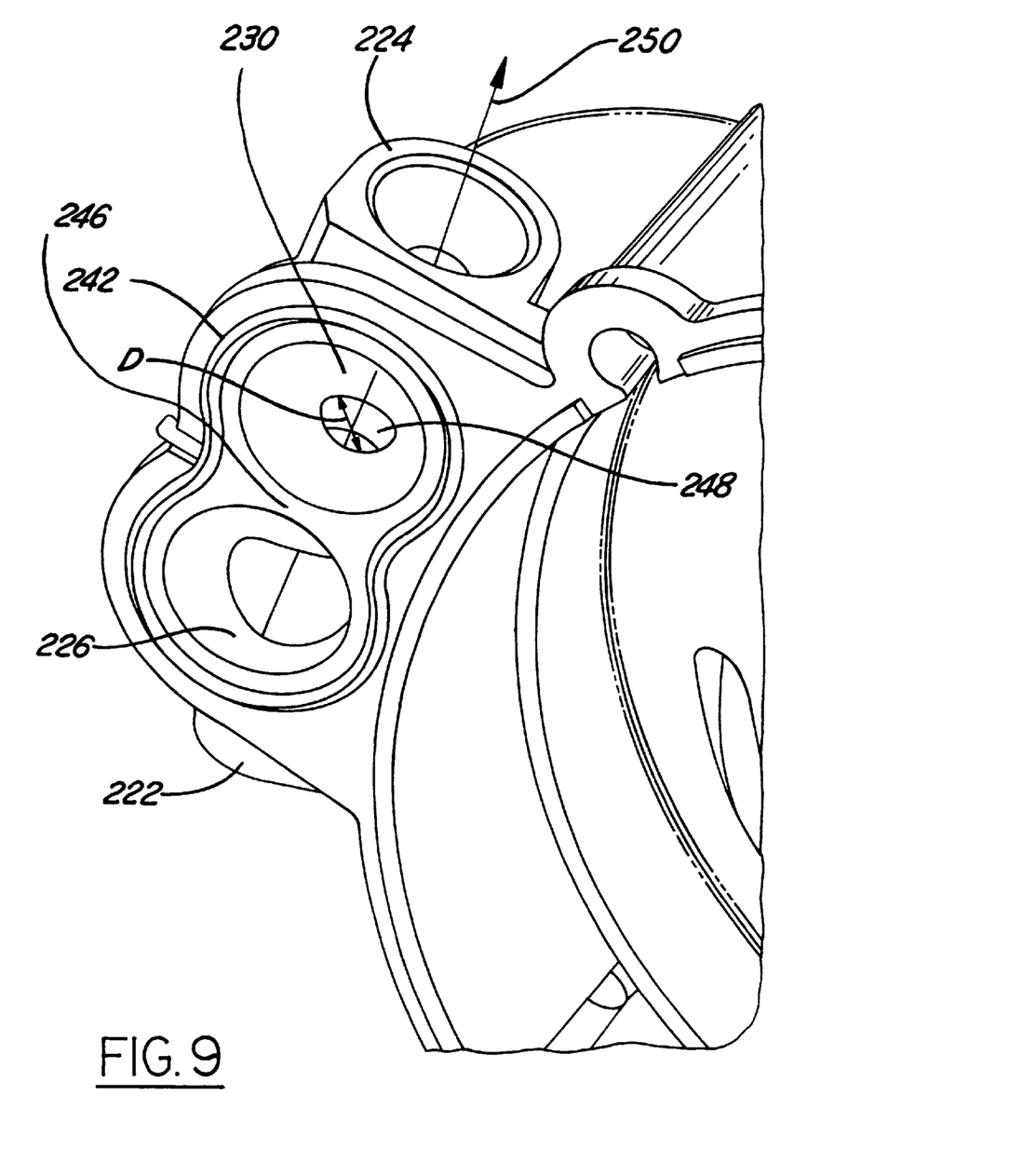
FIG. 9 is a perspective of one housing portion having an inlet according to the present invention.
Figure 10:
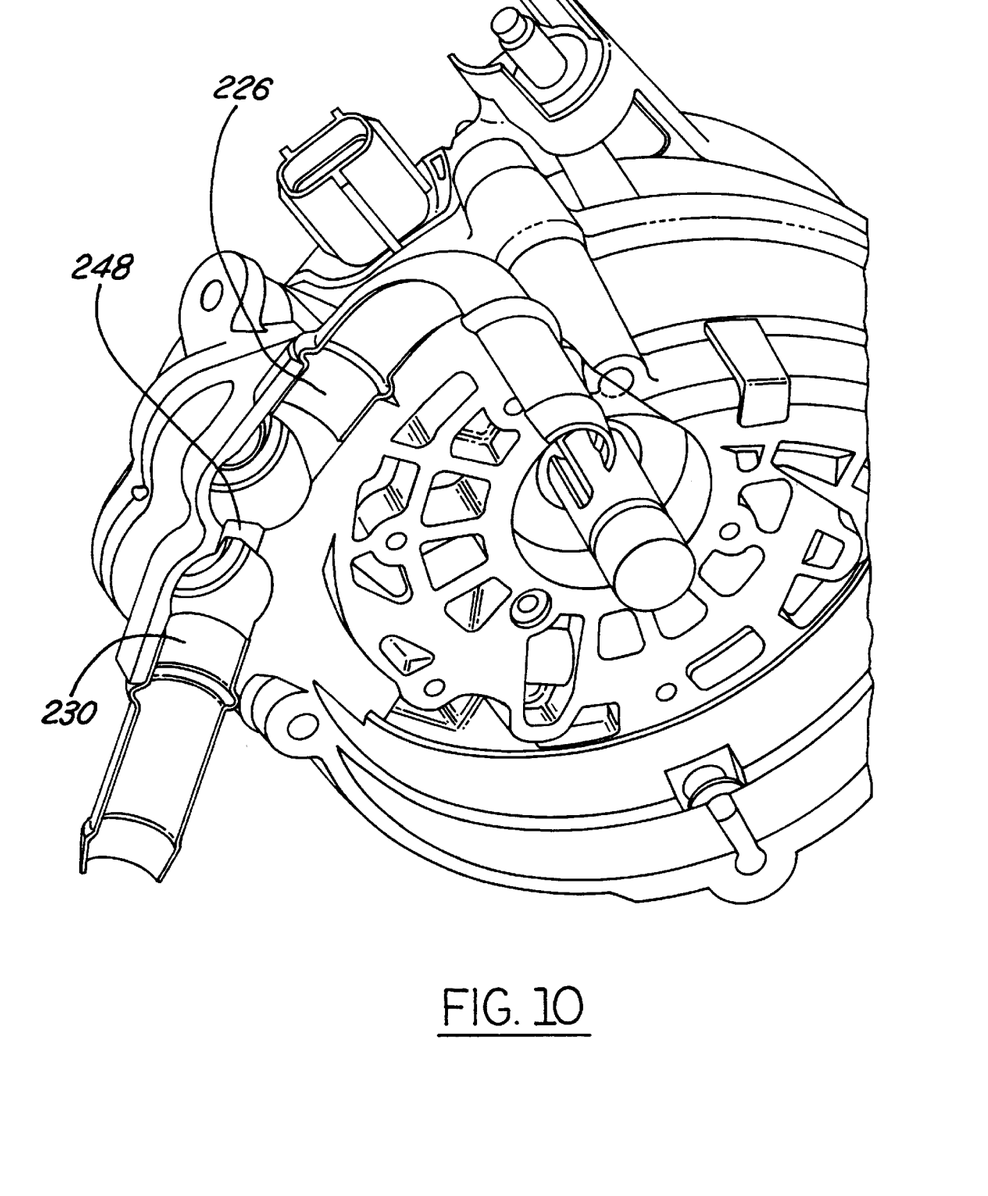
FIG. 10 is a partially cutaway perspective view of a portion of the housing of FIG. 10.

Referring now to FIGS. 9 and 10, a third embodiment of the present invention is illustrated. In this embodiment the same reference numerals used in the second embodiment will be used for the same components. In this embodiment, the common wall 246 between inlet 222 and outlet 224 has a port 248 formed therethrough. Port 248 is sized to allow fluid to pass directly through common wall 246 from inlet 222 and outlet 224. By allowing fluid to pass directly between inlet 222 and outlet 224, the fluid resistance of the alternator is reduced. Moreover, the amount of fluid traveling through first cooling tube 80' and second cooling tube 82' is sufficient to cool the alternator. Thus, because the pressure drop across the alternator is reduced, a bypass manifold with its associated hoses and connection is not required.

Preferably, inlet 222, outlet 224 and port 248 are colinear along line 250. However, those skilled in the art will recognize that a non-colinear alignment may be used with the risk of increasing the pressure drop across the alternator.

The diameter D of port 248 may be varied to increase or decrease the pressure drop across the alternator. The amount of pressure increase or decrease across the alternator will vary depending on the particular vehicle configuration and cooling system flow requirements.

Other embodiments may be formed as would be evident to those skilled in the art. For example, the inlet 222 and outlet 224 may be located on alternate housing portions. Further, port 248 may be located in a different housing portion than inlet 222 and outlet 224.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed:

1. An electrical machine comprising:
   a rotor mounted on a shaft for rotation therewith and defining an axis of rotation;
   a stator disposed coaxially with and in opposition to said rotor;
   a housing enclosing said stator and said rotor;
   said housing having a first axial end, said first axial end having a wall with an inner surface and a outer surface, said housing having a second axial end having a wall with an inner surface and an outer surface;
   a first cooling tube having a first end and a second end and an embedded portion thereof embedded between said first inner surface and said first outer surface;
   said housing having a port integrally formed therein, said port directly fluidically coupling said first end of said first cooling tube to said second end of said second cooling tube; and
   a second cooling tube having a first end and a second end and an embedded portion thereof embedded between said inner surface and said outer surface of said wall of said second axial end;
   whereby said first end of said first cooling tube and said first end of said second cooling tube are fluidically coupled together to permit fluid flow in parallel between said first cooling tube and said second cooling tube.

2. An electrical machine as recited in claim 1 further comprising a common wall between said first end of said first cooling tube and said second end of said second cooling tube, said port coupled through said common wall.

3. An electrical machine as recited in claim 1 further comprising a first flange coupled to said first end and said second end of said first cooling tube.

4. An electrical machine as recited in claim 3 further comprising a second flange coupled to said first end and second end of said second cooling tube.

5. An electrical machine as recited in claim 4 further comprising a seal coupled between said first flange and said second flange.

6. An electrical machine as recited in claim 5 further comprising a seal channel in said first flange, said seal is located within said seal channel.

7. An electrical machine as recited in claim 1 further comprising a common wall between said first end of said first cooling tube and said second end of said second cooling tube, said port coupled through said common wall.

8. An electrical machine as recited in claim 1 wherein said inlet, said outlet and said port are substantially colinear.

9. An electrical machine as recited in claim 8 further comprising a first flange coupled to said first end and said second end of said first cooling tube.

10. An electrical machine as recited in claim 9 wherein a second flange coupled to said first end and second end of second end of said second cooling tube.

11. An electrical machine as recited in claim 10 further comprising a seal coupled between said first flange and said second flange.

12. An electrical machine as recited in claim 11 wherein said seal is located within a seal channel in the first flange.

13. An electrical machine as recited in claim 8 wherein said inlet and said outlet are coupled on said first housing portion.

14. An electrical machine as recited in claim 1 wherein said inlet, said outlet and said port are substantially colinear.

15. An electrical machine comprising:
    a rotor mounted on a shaft for rotation therewith and defining an axis of rotation;
    a stator disposed coaxially with and in opposition to said rotor, said stator having stator windings, said stator windings having an axially-extending portion;
    a first housing portion and a second housing portion enclosing said stator and said rotor therebetween;
    said first housing portion having a first axial end, said first axial end having a wall with an inner surface and an outer surface;
    said second housing having a second axial end, said second axial end having a wall with an inner surface and an outer surface;
    a first cooling tube having a first end and a second end and an embedded portion thereof embedded between said inner surface and said outer surface of said first wall, said first end and said second end having a port therebetween directly fluidically coupling said first end to said second end;
    a second cooling tube having a first end and a second end and an embedded portion thereof embedded between said inner surface and said outer surface of said second wall;
    an inlet fluidically coupled to said first end of said first tube and said first end of said second tube;
    an outlet fluidically coupled to said second end of said first tube and said second end of said second tube;
    whereby said first cooling tube and said second cooling tube are fluidically coupled together to permit fluid flow in parallel between said first cooling tube and said second cooling tube.

16. An electrical machine assembly comprising:
    an electrical machine;
    a first housing portion and a second housing portion substantially enclosing the electrical machine, said first housing portion having a first axial end;

said second housing having a second axial end;

a first cooling tube having a first end and a second end and an embedded portion thereof embedded within said first axial end;

a second cooling tube having a first end and a second end and an embedded portion thereof embedded between within said second axial end;

a fluid interface coupled to said first housing, said fluid interface comprising, an inlet fluidically coupled to said first end of said first tube and said first end of said second tube;

an outlet fluidically coupled to said second end of said first tube and said second end of said second tube;

said inlet and said outlet having a common wall therebetween, said wall having a port therethrough directly fluidically coupling said inlet to said outlet;

whereby said first cooling tube and said second cooling tube are fluidically coupled together to permit fluid flow in parallel between said first cooling tube and said second cooling tube.

17. An electrical machine as recited in claim 16 further comprising a first flange coupled to said first end and said second end of said first cooling tube.

18. An electrical machine as recited in claim 17 further comprising a second flange coupled to said first end and second end of said second cooling tube.

19. An electrical machine as recited in claim 18 further comprising a seal coupled between said first flange and said second flange.

* * * * *